United States Patent [19]

Leedom

[11] 3,881,734

[45] May 6, 1975

[54] ROTARY STYLUS CLEANER

[75] Inventor: Marvin Allan Leedom, Princeton, N.J.

[73] Assignee: RCA Corporation, New York, N.Y.

[22] Filed: Jan. 30, 1974

[21] Appl. No.: 437,963

[52] U.S. Cl. .................................. 274/1 R; 274/47

[51] Int. Cl. .............................................. G11b 3/58

[58] Field of Search ............................... 274/47, 1 R

[56] References Cited

UNITED STATES PATENTS

| | | | |
|---|---|---|---|
| 1,335,352 | 3/1920 | Slowey | 274/47 |
| 2,310,275 | 2/1943 | Beebe | 274/47 |
| 2,955,825 | 10/1960 | Staar | 274/47 |
| 3,162,445 | 12/1964 | Henry | 274/47 |
| 3,266,807 | 8/1966 | Van Antwerp | 274/47 |

*Primary Examiner*—Richard E. Aegerter
*Assistant Examiner*—John W. Shepperd
*Attorney, Agent, or Firm*—Eugene M. Whitacre; William H. Meagher

[57] ABSTRACT

In a playback system employing a stylus to recover recorded signals from a video disc when relative motion between the disc and the stylus is established, a rotary stylus cleaner is provided. A freely pivoted, light stylus-arm carrying the stylus is mounted in a housing employed for movement of the stylus between a rest position and a play position. A rotary brush having an axis of rotation perpendicular to the longitudinal axis of the stylus-arm, is located in the path of movement of the stylus between the rest position and the play position. A friction wheel mounted on the axle carrying the rotatable brush, engages the turntable and causes rotation of the brush as the stylus threads through the brush during its travel between the rest position and the play position. A comb having its teeth in engagement with the bristles of the brush is secured to the board for the purpose of cleaning the brush.

5 Claims, 3 Drawing Figures

ROTARY STYLUS CLEANER

BACKGROUND OF THE INVENTION

Figure 1:
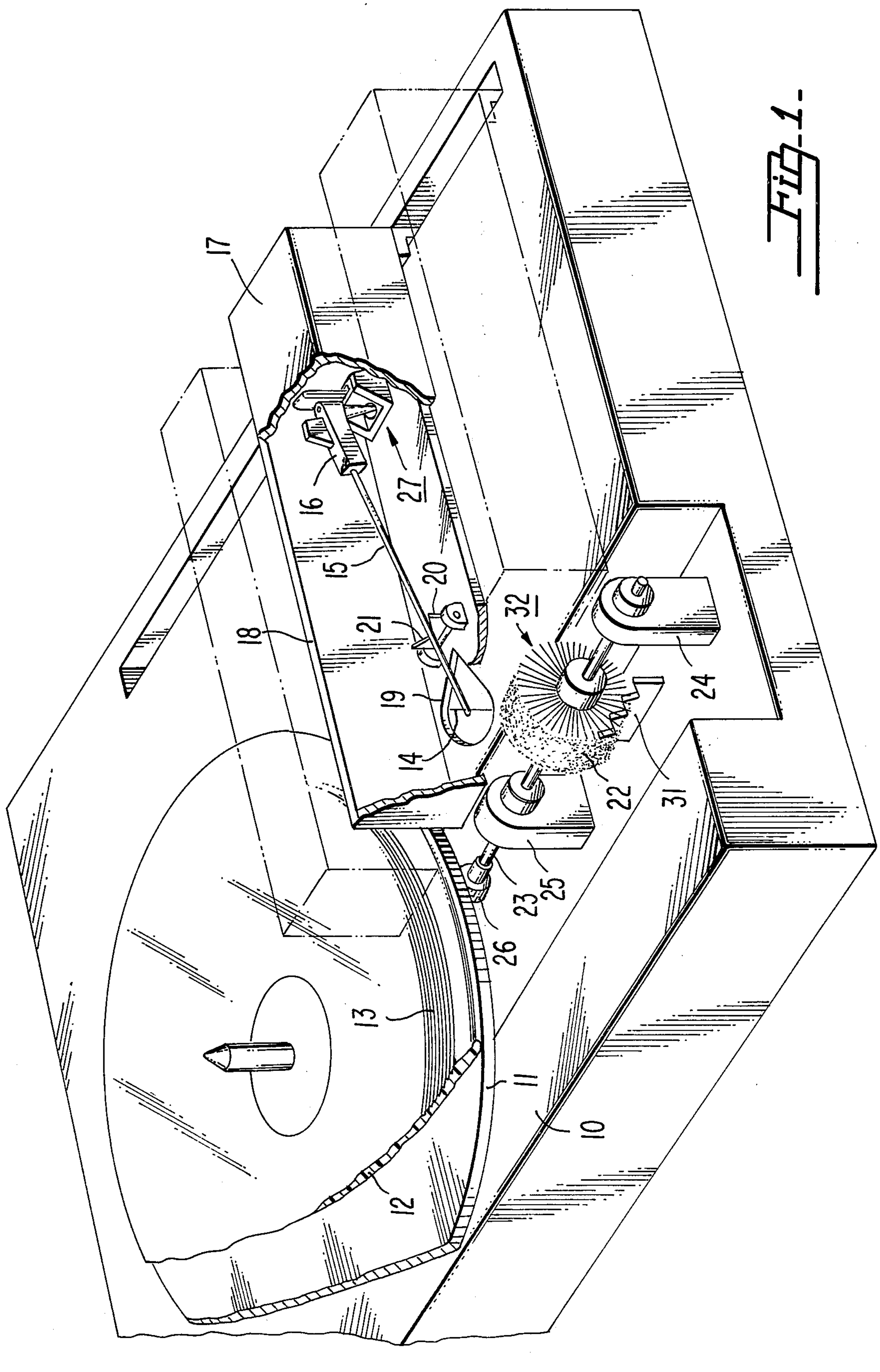

This invention pertains to a rotary stylus cleaner compatible with the requirements of a video disc system.

In video disc systems of a variable capacitance type, as described in detail in the copending U.S. Pat. Application, Ser. No. 126,772, filed Mar. 22, 1971, now U.S. Pat. No. 3,842,194, for J. K. Clemens, entitled "Information Records/ and Recording/ Playback Systems Therefore," video information is recorded by means of geometric variations in the bottom of a smooth spiral groove on the surface of a disc. The disc surface includes a layer of conductive material which is preferably covered with a thin coating of dielectric material. A stylus engages the spiral groove and includes a conductive surface which, together with the conductive material and the dielectric coating of the disc, form a capacitor. When the disc is rotated, an edge of the conductive surface of the stylus, while riding in the disc groove, serves as an electrode of a capacitor varying due to the geometric variations in the bottom of the spiral groove passing beneath. The capacitive variations, which represent recorded video information (such as the NTSC format), are converted to electrical signal variations which are suitably processed and applied to a conventional television receiver for reproduction.

The stylus including the conductive surface is attached to the free end of a stylus-arm. The stylus-arm is freely pivoted at its other end on a support member attached to a stylus-arm carrying mechanism. The stylus-arm carrying mechanism desirably incorporates a suitable feed drive system for primarily performing following functions in a predetermined time sequence: (a)movement of the stylus from a rest position to a play position; (b)movement of the stylus transversely across the disc in proper time relationship with the rotational speed of the disc during play; and (c)a return movement of the stylus from a play position to a rest position.

In video disc systems of the aforementioned Clemens' type (U.S. Pat. Application. Ser. No. 126,772) it is desirable to maintain the relative motion between the disc and the stylus at a predetermined speed (e.g., 450 rpm) to obtain accurate reproduction of the recorded information. Although precise design and manufacture of the disc and playback apparatus minimize the speed errors, random cyclical errors sufficient to noticeably affect the picture quality (e.g., by causing jitter) will remain. Cyclical speed errors emanate from several sources: for example, disc and turntable eccentricities, and disc manufacturing defects, to name a few. Errors caused by the aforementioned sources appear at the stylus once or more each revolution. By way of example, speed errors caused by the disc mounting eccentricity will occur at a frequency of 7.5Hz (at disc rotational speed of 450 rpm). Speed errors caused by two disc manufacturing defects per groove (e.g., two scratches) will repeat at a frequency of 15 Hz (at disc rotational speed of 450 rpm), and so on. In U.S. Pat. No. 3,711,641, issued to R. C. Palmer on Jan. 16, 1973, entitled "Velocity Adjusting System," a system is disclosed for compensating cyclical speed errors by varying the position of the stylus in the groove in a direction tangential to the groove at the point of engagement. This is accomplished by providing a support member for the stylus arm pivot, which is rendered subject to a correcting motion in response to cyclical speed errors. For satisfactory operation of the velocity adjusting system of the above type, the motion imparted to the support member of the stylus arm pivot assembly must be transmitted to the stylus substantially with minimum phase lag at the error frequencies. Therefore, it is desirable that the stylus arm assembly be light and sensitive to cope with the requirements of the velocity adjusting system.

In video disc systems, adequate bandwidth for monochrome and color display is obtained by rotating the disc at a speed substantially higher (e.g., 450 rpm) than the conventional audio playback speeds (e.g., 33 ⅓ rpm). For a given number of imperfections per groove, the higher the speed of rotation, the higher would be the frequency of disturbances with which the stylus-arm assembly must cope with so that the stylus can faithfully follow the variations in the bottom of the groove on the disc. This provides an additional reason for the requirement that the stylus-arm assembly be light and sensitive.

With passage of time, there is a tendency for dust, lint, and other foreign particles to accumulate in the grooves of the disc. The stylus riding in the groove during playback scoops the dust, lint, etc., accumulated in the groove, causing a gradual grit build-up on the stylus. The build-up, besides causing degradation of the quality of the signals reproduced, grinds both the stylus and the disc, thereby reducing their operating lives. The present invention proposes, to avoid such deleterious effects, the provision in the player apparatus of means for periodically removing the build-up on the stylus.

However, because of the above-discussed requirements for a very light and sensitive stylus-arm assembly in video disc players, achievement of periodic cleaning of the stylus presents a rather difficult problem. In the past, various audio disc systems have employed a stationary brush in the path of travel of the stylus between the rest position and the play position. Such a prior art arrangement is not attractive for use in video disc players, because, as the stylus pushes through the stationary brush, a force perpendicular to the longitudinal axis of the stylus-arm sufficient to bend the stylus-arm would be exerted, thereby possibly causing permanent damage to the delicate stylus-arm. Video discs, typically, employ a relatively high groove density (illustratively, 4,000 grooves per inch) and consequently very narrow grooves. Even a slight bending of the stylus-arm would be sufficient for the stylus to skip several grooves as it is lowered to the disc surface for playback thereby resulting in misalignment. Moreover, a bending of the stylus-arm may alter the attitude of the stylus tip in the groove in a manner adversely affecting signal recovery.

In accordance with an illustrative embodiment of the present invention, a rotary stylus cleaner is incorporated in a video disc player. A freely pivoted, light and sensitive stylus-arm (carrying the stylus) is mounted in a housing employed for movement of the stylus between a rest position and a play position. A rotatable brush having an axis of rotation perpendicular to the longitudinal axis of the stylus-arm, is located in the path of movement of the stylus between a rest position and a play position. A friction wheel mounted on the axle carrying the rotatable brush, engages the turntable and causes rotation of the brush as the stylus threads through the brush during its travel between the rest position and the play position. A group of bristles sweeps past the stylus, as the stylus threads through the rotating brush, in a direction along the longitudinal axis of the stylus-arm. The stylus substantially splits the group of bristles into two parts. The forces exerted by the two parts of bristles are substantially equal in magnitude and opposite in direction along a line perpendicular to the longitudinal axis of the stylus arm. Therefore, due to the above neutralization effect, the stylus-arm experiences substantially minimum forces perpendicular to its longitudinal axis.

Pursuant to a further feature of the present invention, a comb having its teeth in engagement with the bristles of the brush may be secured to the board for the purpose of automatically cleaning the brush during brush rotation.

Figure 2:
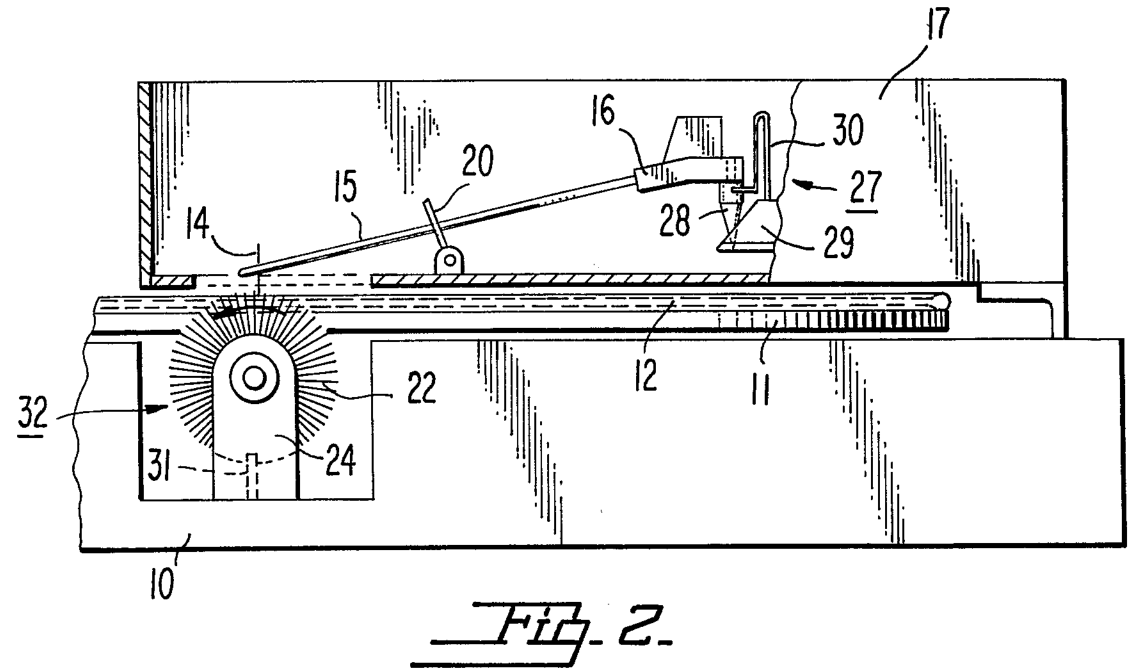
Figure 3:
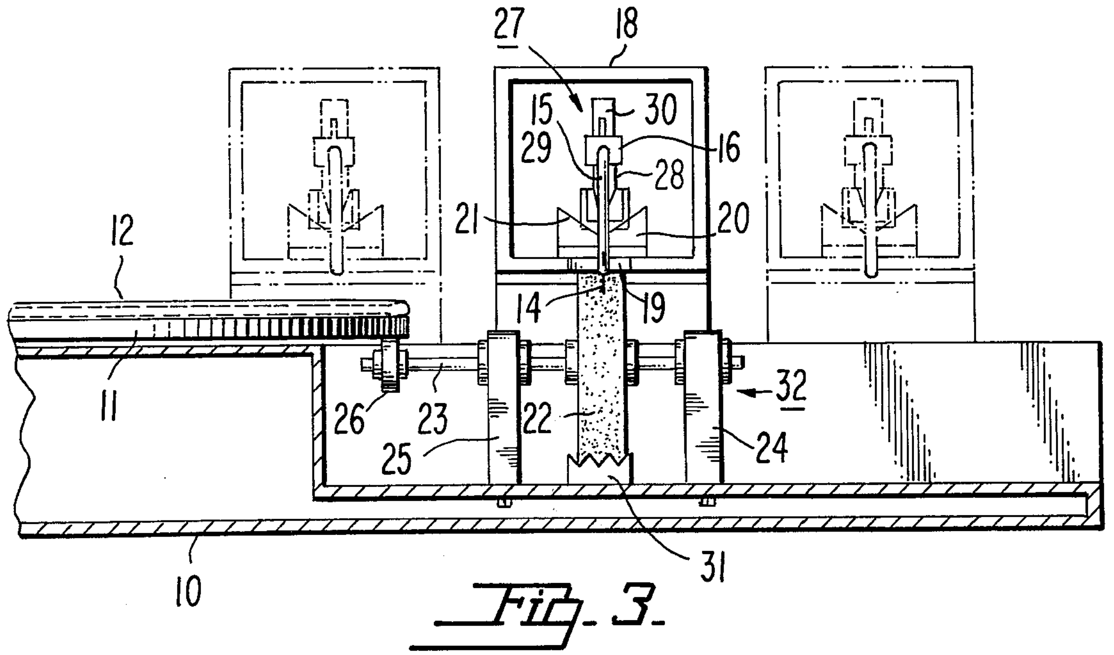

The objects and advantages of the present invention will be recognized by those skilled in the art upon a reading of the following detailed description and an inspection of the accompanying drawings, in which:

FIG. 1 is a partially cut-away perspective view of a video disc player system incorporating a rotary stylus cleaner in accordance with the principles of the present invention, the stylus being shown threading through the rotating brush in the course of stylus movement from the rest position to the play position; and FIGS. 2 and 3 illustrate and end view and an elevation, respectively, of the FIG. 1 apparatus, depicting the details of the rotary stylus cleaner, with certain parts broken away for clarity.

DESCRIPTION OF THE INVENTION

FIG. 1 illustrates a portion of a player comprising a motorboard 10 having a turntable 11 rotatably secured thereon. The player is suitable for use in a video disc system such as disclosed in the aforementioned copending Clemens application. The surface of the turntable 11 is adapted to support a disc 12. A motor and a suitable engaging mechanism (not shown) drives the turntable 11 at a predetermined speed when the player is operative. The rotational motion of the turntable 11 is transmitted to the disc 12 via mutual frictional contact. Video information is contained in geometric variations in the bottom of a smooth spiral groove 13 of the disc 12. The disc surface includes a layer of conductive material which is preferably covered with a thin coating of dielectric material. A stylus 14, subject to positioning in the groove 13 includes a conductive surface which, together with the conductive material and dielectric coating of the disc, form a capacitor. When relative motion is established between the stylus 14 and the disc 12, an edge of the conductive surface included in the stylus, while riding in the groove 13, serves as an electrode of a capacitor varying due to the geometric variations in the bottom of the spiral groove passing beneath. The varying capacitance is coupled via the conductive surface of the stylus 14 and a stylus arm 15 to suitable signal processing means which convert the capacitance variations to electrical signal variations representative of the recorded video information. The signal output of the signal processing means may be applied to a conventional television receiver to effect image reproduction.

The other end of the stylus arm 15 is permanently inserted into a stylus arm holder 16. The stylus arm holder 16 is flexibly coupled to a stylus arm carrying mechanism by a spring loaded pivot coupling 27 (described later). The stylus arm carrying mechanism comprises a velocity adjusting system 17 mounted on a suitable feed drive system. The feed drive system primarily performs the following functions: (a) a lateral movement of the stylus transversely across the disc in proper time relationship with the rotational speed of the disc while playing the disc, the positive lateral movement of the stylus being desirable as the fragile walls of relatively narrow grooves of the video disc cannot be dependably relied upon to pull the stylus arm assembly around the pivot across the entire recorded surface of the disc; and (b) the programmed movements of the stylus between a rest position and a play position, upon play initiation, and in a return to the rest position, upon play termination.

Illustratively, velocity adjusting system 17 may be of the type disclosed in U.S. Pat. No. 3,711,641, issued to R. C. Palmer on Jan. 16, 1973, entitled "Velocity Adjusting System." In the Palmer system, the cyclical speed errors in the relative speed between the disc 12 and the stylus 14 are compensated by varying the position of the stylus in relation to the disc. Circuit means provide an error signal representative of deviation of the instantaneous speed from the predetermined speed. Transducer means, responsive to the error signal, impart motion to the stylus arm pivot coupling in a direction tangential to the groove at the point of engagement in a manner that minimizes the speed error.

A box-like shield enclosure 18, attached to the velocity adjusting system 17, houses the stylus arm assembly. The stylus-arm 15 protrudes through an aperture 19 in the bottom of the shield enclosure 18 permitting the stylus 14 to ride in the groove 13 of the disc 12. In the inoperative position, a pivotally mounted stylus arm centering ramp 20 sustains the free end of the stylus-arm 15. As the stylus-arm 15 is lifted out of groove engagement by the centering ramp 20, which may be manually or automatically actuated, the V-shaped slot 21 provided in the centering ramp permits the stylus-arm to gravitate to the center of the ramp. As the stylus-arm 15 is lowered for playback, the V-shaped slot 21 causes the stylus 14 to descend substantially centrally for smooth engagement with the spiral groove 13 in a manner that minimizes the likelihood of misalignment. It is noted that in the operative position the centering ramp 20 is out of contact with the stylus-arm 15 to permit free pivotal movement of the stylus-arm. Reference may be made to the copending application of Frederick R. Stave, Ser. No. 351,600, filed Apr. 16, 1973, and entitled "Video Disc Playback Apparatus," for examples of apparatus which may be employed to effect the ramp actuation and stylus housing drive functions in the above-described player operations.

A rotatable brush 22 having an axle of rotation 23 perpendicular to the longitudinal axis of the stylus-arm 15, is located in the path of movement of the stylus 14 between the rest position and the play position. The axle 23 is supported on bearings 24 and 25 secured to the motorboard 10. A friction wheel 26, mounted on the axle 23, engages the turntable 11 and causes rotation of the brush as the stylus 14 threads through the brush during its travel between the rest position and the play position. A deactivating means may be provided for decoupling the friction wheel 26 from the turntable 11 when the cleaning means are not in operation. A comb 31 having its teeth in engagement with the bristles of the brush 22 is secured to the board for the purpose of automatically cleaning the brush 22 during brush rotation.

FIGS. 2 and 3 illustrate an end view and an elevation of the rotary stylus cleaner. The spring loaded pivot coupling 27 comprises a plug 28 inserted at one end permanently in the stylus arm holder 16. The plug 28 is received at the other end in a "closed-ended" opening disposed in a support member 29. The support member 29 is attached to the movable member of the velocity adjusting system 17. A spring member 30 coupled to the plug 28 and the support member 29 continuously urges the plug and the stylus-arm 15 (carrying the stylus) toward the disc surface. The moment exerted by the spring member 30 on the stylus-arm 15, is balanced by an equal and opposite moment exerted by (1) the disc 12 when the player is operative (play position), and by (2) the ramp 20 when the player is inoperative. As illustrated in FIG. 2, the stylus-arm 15, both in the operative and inoperative position, inclines (illustratively, subtends an angle of approximately 7° to 10°) towards the surface of the disc 12. The direction of rotation of the brush is such as to produce tension in the stylus-arm 15. The reasons for such an arrangement are twofold. First, if the direction of rotation of the brush 22 were such as to cause compression in the stylus-arm 15, and if the stylus 14 were caught in the bristles of the brush, then the stylus-arm would have a tendency to dig into the brush with possibility of permanent damage to the delicate stylus arm assembly. However, when the direction of rotation of the brush 22 is as indicated in FIG. 2, and if the stylus 14 were caught in the bristles of the brush, then the stylus arm would be simply lifted out of the opening in the support member 29. An additional advantage of the noted rotational direction is that when the stylus-arm 15 is in tension, the spring member 30 is relieved from compression, thereby increasing the life of the spring member.

In the past, various audio disc systems employed a stationary brush in the path of travel (perpendicular to the longitudinal axis of the stylus-arm) of the stylus between the rest position and the play position. As the stylus pushes through the stationary brush, a group of bristles engaged by the stylus is split in two parts. The forces exerted by the two parts have components in a direction along and perpendicular to the longitudinal axis of the stylus-arm. In the stationary brush arrangement, the components along the longitudinal axis of the stylus-arm neutralize each other, while those perpendicular to the longitudinal axis reinforce each other. Stated in other words, there is a net bending force in a direction perpendicular to the stylus-arm sufficient to cause damage to the delicate stylus arm assembly of a video disc system. In the rotating brush arrangement, according to the principles of the present invention, a group of bristles sweeps past the stylus 14, as the stylus threads through the rotating brush 22, in a direction along the longitudinal axis of the stylus-arm 15. The components of the forces exerted on the stylus-arm 15 along the longitudinal axis of the stylus arm reinforce each other, while those perpendicular to the longitudinal axis neutralize each other. Expressed differently, there is a tension in the stylus-arm 15 but no bending moment. The geometry of the typical stylus-arm is such that they can withstand forces along the longitudinal axis better than those perpendicular to the axis.

Thus, the rotary stylus cleaner embodiment of the principles of the present invention is simple in construction, efficient in operation (due to several passes of the brush) and well suited for periodically cleaning the stylus without exerting any bending moments on the stylus-arm.

What is claimed is:

1. In a disc playback system including a board, a turntable mounted for rotation relative to said board and having a turntable surface adapted to receive a disc having a spiral groove with information recorded therein; a stylus subject to placement in said groove for recovering said information while in a play position; and a light stylus-arm carrying said stylus, said stylus-arm being mounted with respect to said board in a manner permitting movement of said stylus between rest and play positions substantially radially of said disc; a rotary stylus cleaner comprising:

a rotatable brush, having an axis of rotation substantially perpendicular to the longitudinal axis of the light stylus-arm mounted on said board, said brush including bristles with axes ordinarily disposed in planes substantially parallel to the stylus-arm longitudinal axis and substantially perpendicular to the axis of rotation of said brush, and said brush being located in the path of movement of said stylus between the rest position and the play position radially of said disc; and drive means secured to said board and coupled to said brush for causing rotation of said brush for the purpose of cleaning said stylus.

2. A system as defined in claim 1 wherein said drive means for rotating said brush includes a wheel frictionally driven by said turntable.

3. A system as defined in claim 2 wherein the coupling between said brush and said drive means is a common axle carrying said wheel and said brush.

4. A system defined in claim 1 further including a comb secured to said board having its teeth in engagement with said brush for the purpose of cleaning said brush.

5. A system as defined in claim 1 wherein the direction of rotation of said brush is such as to produce tension in said stylus-arm during its movement through said brush location.

* * * * *